United States Patent
Wu

(10) Patent No.: US 11,201,719 B2
(45) Date of Patent: Dec. 14, 2021

(54) INTERFERENCE REDUCTION IN DYNAMIC TDD SYSTEMS

(71) Applicant: SAMSUNG ELECTRONICS CO., LTD., Suwon-si (KR)

(72) Inventor: Shangbin Wu, Staines Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/622,262

(22) PCT Filed: Jun. 12, 2018

(86) PCT No.: PCT/KR2018/006661
§ 371 (c)(1),
(2) Date: Dec. 12, 2019

(87) PCT Pub. No.: WO2018/230943
PCT Pub. Date: Dec. 20, 2018

(65) Prior Publication Data
US 2020/0106593 A1    Apr. 2, 2020

(30) Foreign Application Priority Data

Jun. 14, 2017 (GB) ..................... 1709472

(51) Int. Cl.
*H04L 5/14* (2006.01)
*H04L 5/00* (2006.01)
*H04W 24/08* (2009.01)

(52) U.S. Cl.
CPC .............. *H04L 5/14* (2013.01); *H04L 5/0048* (2013.01); *H04L 5/0073* (2013.01); *H04W 24/08* (2013.01)

(58) Field of Classification Search
None
See application file for complete search history.

(56) References Cited

U.S. PATENT DOCUMENTS

2014/0185532 A1* 7/2014 Rao ..................... H04W 72/082
                                                       370/329
2016/0262137 A1* 9/2016 Behravan .......... H04W 72/1263
(Continued)

FOREIGN PATENT DOCUMENTS

WO    2017/022937    2/2017

OTHER PUBLICATIONS

Zte, "Discussion on Measurement and RS Design for CLI Mitigation", 3GPP Meeting #88, R1-1701615, Feb. 2017. (Year: 2017).*

(Continued)

*Primary Examiner* — Jamaal Henson
(74) *Attorney, Agent, or Firm* — Nixon & Vanderhye P.C.

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of operating a telecommunication system utilising dynamic Time Division Duplex, TDD.

8 Claims, 3 Drawing Sheets

(56) References Cited

U.S. PATENT DOCUMENTS

| | | | |
|---|---|---|---|
| 2017/0041880 A1* | 2/2017 | Ouchi | H04W 52/146 |
| 2017/0366377 A1* | 12/2017 | Papasakellariou | H04L 5/005 |
| 2018/0213531 A1 | 7/2018 | Kim et al. | |
| 2018/0337756 A1* | 11/2018 | Nam | H04L 5/0051 |
| 2020/0067614 A1* | 2/2020 | Wang | H04J 11/0023 |

OTHER PUBLICATIONS

Huawei, "Evaluation on Duplexing Flexibility in Indoor Hot-Spot Scenario", 3GPP Meeting #88, R1-1701672, Jan. 2017. (Year: 2017).*

International Search Report for PCT/KR2018/006661 dated Sep. 27, 2018, 3 pages.

Written Opinion of the ISA for PCT/KR2018/006661 dated Sep. 27, 2018, 6 pages.

Search Report for GB 1709472.3 dated Nov. 23, 2017, 2 pages.

Samsung, "Timing alignment on cross-link for dynamic TDD", R1-1708058, 3GPP TSG RAN WG1 Meeting #89, China, May 4, 2017, 7 pages.

Qualcomm Incorporated, "Dynamic TDD Cross-link interference management considerations", R1-1708652, 3GPP TSG RAN WG1 Meeting #89, China, May 7, 2017, 10 pages.

Ericsson, "On Hybrid TDD for Cross-link Interference Mitigation", R1-1709120, 3GPP TSG RAN WG1 Meeting #89, May 7, 2017, China, 6 pages.

Nokia et al., "LBT-based UL transmission for dynamic TDD", R1-1708821, 3GPP TSG RAN WG1 Meeting #89, May 5, 2017, China, 3 pages.

AT&T, "Design of Interference Measurement for NR", R1-1702296, 3GPP TSG RAN WG1 Meeting #88, Feb. 13, 2017, Greece, 7 pages.

Huawei et al., "On cross-link interference mitigation for duplexing flexibility", R1-1701669, 3GPP TSG RAN WG1 Meeting #88, Greece, Feb. 13, 2017, 5 pages.

Nokia et al., "Dynamic TDD Interference Mitigation Concepts in NR", R1-1703110, 3GPP TSG RAN WG1 Meeting #88, Greece, Feb. 13, 2017, 6 pages.

Nokia et al., "Xn Support to aid TDD Interference Mitigation and Coordination", R1-1708820, 3GPP TSG RAN WG1 #89, May 14, 2017, China, 5 pages.

Extended Search Report dated Jan. 29, 2021 in counterpart European Patent Application No. EP18816908.0.

"3rd Generation Partnership Project; Technical Specification Group Radio Access Network; Study on New Radio Access Technology Physical Layer Aspects (Release 14)", 3GPP Standard; Technical Report; 3GPP TR 38.802, 3rd Generation Partnership Project (3GPP), Mobile Competence Centre; 650, Route Des Lucioles; F-06921 Sophia-Antipolis Cedex; France, vol. RAN WG1, No. V14.0.0, Mar. 25, 2017 (Mar. 25, 2017), pp. 1-143, XP051297632, [retrieved on Mar. 25, 2017].

Zte: "Overview of Duplexing and Interference Management", 3GPP Draft; R1-1707203—7.1.6 Overview of Duplex and Interfer Mangt, 3rd Generation Partnership Project (3GPP), Mobile Competence Centre, vol. RAN WG1, No. Hangzhou; May 15, 2017-May 19, 2017 May 14, 2017 (May 14, 2017), XP051272418, Retrieved from the Internet:URL: http://www.3gpp.org/ftp/Meetings_3GPP_SYNC/RAN1/Docs/ [retrieved on May 14, 2017].

* cited by examiner

[Fig. 1]
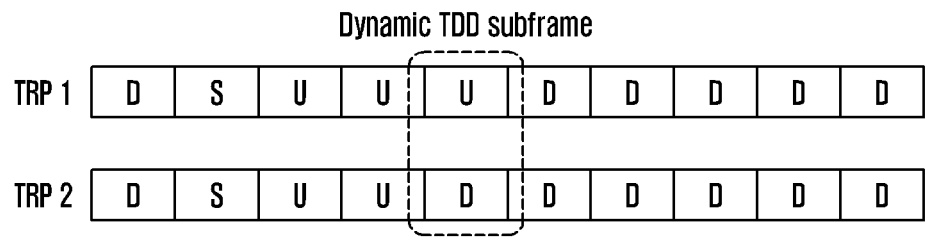
[Fig. 2]
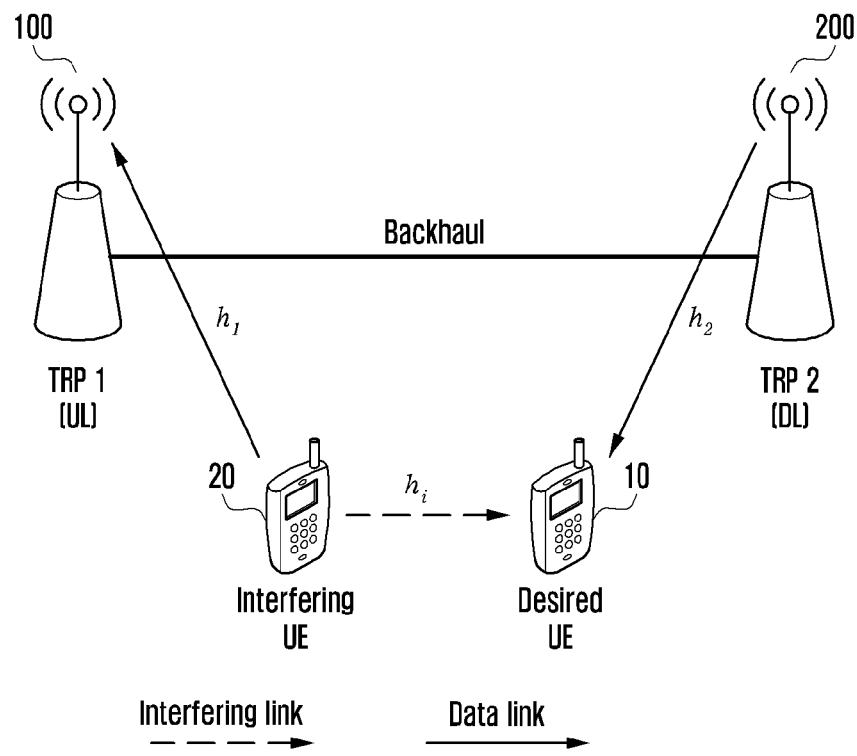

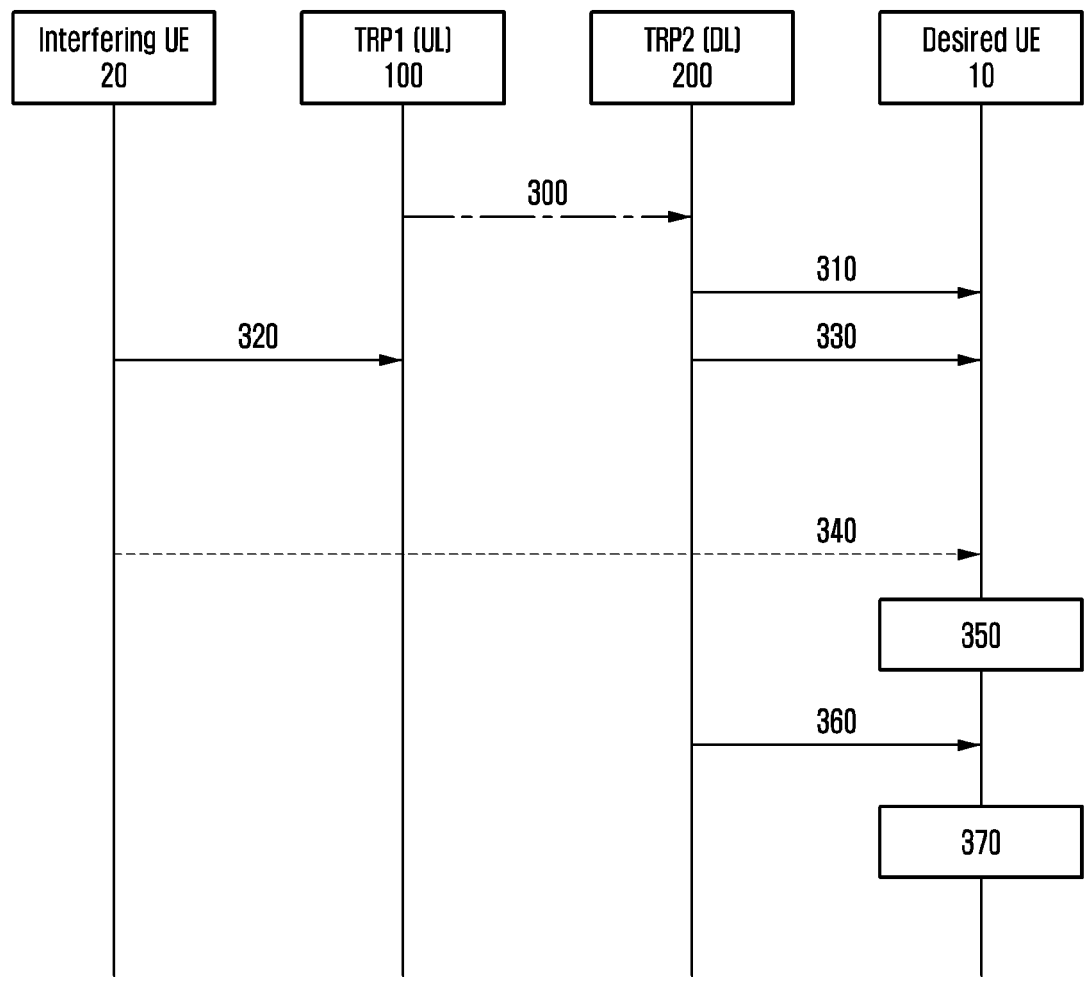
[Fig. 3]

[Fig. 4a]
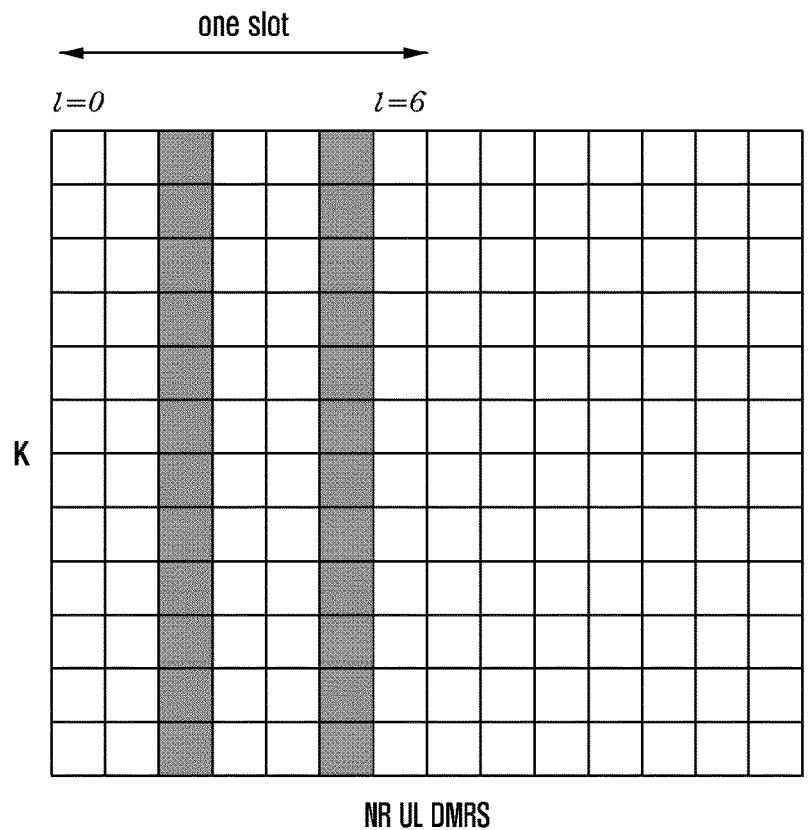
NR UL DMRS
[Fig. 4b]
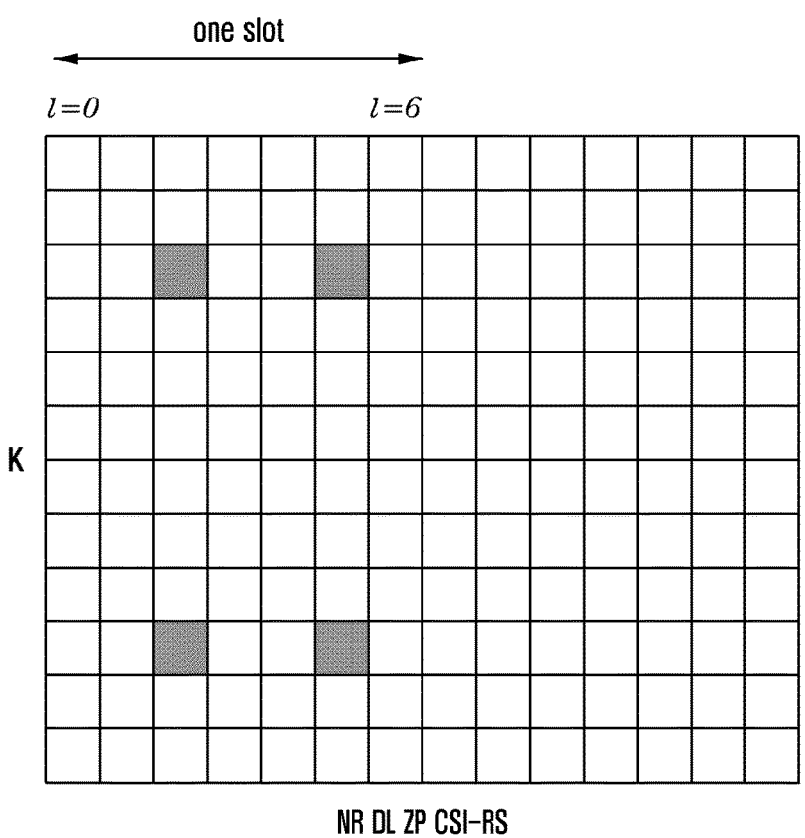
NR DL ZP CSI-RS

INTERFERENCE REDUCTION IN DYNAMIC TDD SYSTEMS

TECHNICAL FIELD

The present invention relates to an improved means of achieving a reduction in interference in a telecommunication system employing dynamic Time Division Duplexing (TDD). Such systems include New Radio (NR) in Fifth Generation (5G) systems, although other systems are capable of benefiting from embodiments of the invention.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full. Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology" "wired/wireless communication and network infrastructure" "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Dynamic TDD can provide flexibility, allowing the network to boost user equipment (UE) throughput in both downlink (DL) and uplink (UL). This is achieved by allowing TRPs to configure certain subframes to DL or UL flexibly.

However, it can suffer from UE to UE (UE-UE) cross link interference (CLI) when there is a mismatch between the UL and DL subframe. This can largely limit the system performance. This is illustrated in FIG. 1, which shows subframe structure related to two different transmission points, TRP1 and TRP2. This is further illustrated in FIG. 2. In one particular subframe, a UE (the interfering UE 20) is communicating on the Uplink to TRP1 and TRP2 is communicating on the Downlink to the desired UE (10). As can be seen in FIG. 2, TRP1 100 and TRP2 200 communicate via a backhaul data connection and each communicates with a respective UE. Furthermore, due to the dynamic TDD system, there will be occasions when UE 20 is transmitting to TRP1 100 at the same time that UE 10 is receiving from TRP2 200. This results in an interference signal from UE 20 to UE 10, as shown by the dashed line between the two UEs.

It can suffer from UE to UE (UE-UE) cross link interference (CLI) when there is a mismatch between the UL and DL subframe. This can largely limit the system performance.

SUMMARY

Embodiments of the invention aim to address problems arising from the UE-UE CLI which is encountered in such situations.

According to the present invention there is provided an apparatus and method as set forth in the appended claims. Other features of the invention will be apparent from the dependent claims, and the description which follows.

According to a first aspect of the invention there is provided a method of operating a telecommunication system utilising dynamic Time Division Duplex, TDD, comprising the steps of: a first Transmission Point (100) transmitting (300) to a second Transmission Point (200) information regarding a configuration of a reference signal of an interfering User Equipment (20) in communication with the first Transmission Point (100), wherein the second Transmission Point (200) is in communication with a desired User Equipment (10); the second Transmission Point (200) transmitting a message (310) to the desired User Equipment (10) to assign resources to enable the desired User Equipment (10) to measure channel information of the interfering User Equipment (20); the desired User Equipment (10) measuring (350) interference (340) from a transmission (320) from the interfering User Equipment (20) to the first Transmission Point (100); and performing a receive operation (370) on a signal (360) transmitted from the second TRP (200) to the desired User Equipment (10).

Embodiments of the invention provide UE-UE CLI mitigation in network coordination, whereby multiple transmission points (TRPs) are allowed to exchange information mutually via a backhaul data connection.

In order to assist in this process, a DL UE is able to measure interference (channel) from other coordinated TRPs via zero power channel state information (ZP CSI) reference signal (RS). Since the resource element (RE) with ZP CSI RS includes no signal from the serving TRP, the aggregated signal in the ZP CSI RS resource will be the interference. After measuring the interference, the UE can perform advanced receive operations to suppress this interference.

Essentially, embodiments of the invention treat the interfering UE 20, transmitting a UL signal, as if it were a TRP. Appropriate signalling is provided to let the UL TRP inform the DL TRP about the configurations of the UL demodulation RS (DMRS), which may include the time-frequency location of the UL DMRS, cyclic shift, group number, etc. With this information, the DL TRP can assign ZP CSI RS to the DL desired UE to measure interference.

Although a few preferred embodiments of the present invention have been shown and described, it will be appreciated by those skilled in the art that various changes and modifications might be made without departing from the scope of the invention, as defined in the appended claims.

Advantageously, embodiments of the invention are able to utilise existing Reference Signals (RS) to mitigate the problems experienced in the prior art.

However, this is not supported in prior art LTE systems because the CSI RS resources do not overlap with UL DMRS. Therefore, embodiments of the invention provide a CSI RS whose resource partially overlaps with UL DMRS.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 1 shows a representation of a subframe structure in dynamic TDD systems;

FIG. 2 shows a schematic of a network operating in dynamic TDD mode;

FIG. 3 shows a signalling flow diagram according to an embodiment of the present invention; and FIGS. 4a and 4b shows certain network resources according to an embodiment of the present invention.

DETAILED DESCRIPTION OF EXAMPLE EMBODIMENTS

Two options were considered for UE-UR interference measurement. These were based on use of one of two different Reference Signals (RS): UL sounding reference signal (SRS) and UL DMRS. There are certain advantages and disadvantages associated with each option. If the UL SRS is used, this is periodic and places lower requirements on backhaul capacity and delay but it may not be precoded as user data. UL DMRS may be precoded as user data; its interference channel power can be measured; and it is possible to measure interference channel coefficients. However, it places higher requirements on backhaul capacity and delay.

Since UL DMRS can allow UEs to measure coefficients of the interference channel, this can significantly mitigate UE-UE CLI. Therefore, embodiments of the present invention utilise UL DMRS as part of the strategy to mitigate UE-UE CLI.

Embodiments of the invention utilise a message sent via the backhaul from the UL TRP 100 to the DL TRP 200, informing the DL TRP 200 about the configurations of UL DMRS of the interfering UE 20. The configurations of the UL DMRS may include the locations of the UL DMRS, cyclic shift of the UL DMRS sequence, orthogonal sequence, etc., such that the desired UE 10 can estimate the UL DMRS from the interfering UE 20.

Additionally, a zero-power CSI RS resource setting is required such that the DL TRP 200 can inform the desired UE 10 where to measure the channel information of the CLI. As a result, the UE is able to mitigate CLI with advanced receiver algorithms, details of which will follow.

The messaging protocol is illustrated in FIG. 3 which shows the various communications between the four entities: Interfering UE 20, TRP1 100, TRP2 200 and Desire UE 10.

A message 300 is sent from the UL TRP 100 to the DL TRP 200, via the backhaul connection, informing the DL TRP 200 about the configurations of UL DMRS of the interfering UE 20, with which the UL TRP 100 is in communication. The message 300 includes the time-frequency locations of the UL DMRS, cyclic shift of the UL DMRS sequence, orthogonal sequence, group number, base sequence number, etc.

The configurations of the UL DMRS may include the locations of the UL DMRS, cyclic shift of the UL DMRS sequence, orthogonal sequence, etc. The DL TRP 200, in message 310, then assigns ZP CSI RS resources for the desired UE 10 to measure the channel information of the interfering UE 20.

A further optional message 330 from the DL TRP 200 to the desired UE 10 can be sent, for the purpose of estimating the complex channel coefficients or the covariance matrix of interference at the desired UE 10. This message is described as optional as it is not required in all circumstances. Further details follow later.

The interfering UE 20 transmits UL signals 320 to the UL TRP 100. This is an interfering signal 340 for the desired UE 10 and so corrupts the DL signal transmitted from TRP2 200 to the desired UE 10.

At step 350, the desired UE 10 measures interference at the ZP CSI RS resources and, at step 370, performs advanced receiver algorithms to decode the DL signal 360, sent from TRP2 200 to desired UE 10. The advanced receiver algorithms may include techniques such as interference rejection combining receiver algorithms.

In order for the desired UE 10 to estimate the channel from the interfering UE 20, the DL TRP 200 assigns a ZP CSI RS resource to the desired UE 10. In prior art LTE systems, the design of DL CSI RS resources and UL DMRS is independent.

However, in embodiments of the invention there is a correlation between these resources. This is shown in FIGS. 4a and 4b. The correlation is done by allowing CSI RS resources, shown in FIG. 4b to be a subset of Resource Elements (REs) occupied by UL DMRS, shown in FIG. 4a. In each case, the respective resources are shown as shaded and it can be clearly seen that the CSI RS reside fully within the resource allocation for UL DMRS.

In other words, the CSI RS resource can be configured in REs that are overlapped with UL DMRS. The DL TRP 200 can configure ZP CSI RS on these resources such that the desired UE is able to estimate interfering channels. It does this by utilizing the 'silence' in these resources to estimate the interference due to the interfering UE 10. The term 'silence' here indicates that the TRP 200 is not transmitting and so any signals received at the desired UE 10 are considered to be due to the interfering UE 20.

In addition, the DL TRP 200 can optionally transmit (at step 330) the UL DMRS configuration of the interfering UE 20 to the desired UE 10.

If the UL DMRS configuration of the interfering UE 20 is sent (at step 330), then the desired UE 10 can try to estimate the complex channel coefficient or the covariance matrix of the interfering channel. Hence, the desired UE 10 can perform Minimum Mean Squared Error Interference Rejection Combining (MMSE-IRC) to suppress CLI. In this case, the UE-UE CLI mitigation procedure is non-transparent to the desired UE 10 i.e. the desired UE is actively involved in the process, since it is required to estimate the complex channel coefficient or the covariance matrix of the interfering channel.

However, if the UL DMRS configuration of the interfering UE 20 is not sent, the desired UE 10 can try to estimate power of the interfering channel. Hence, the desired UE can perform Minimum Mean Squared Error Maximum Ratio Combining (MMSE-MRC) to suppress CLI. The UE-UE CLI mitigation procedure is transparent to the desired UE, since it is not required to estimate the complex channel coefficient or the covariance matrix of the interfering channel and merely estimates the power of the interfering channel.

Embodiments of the invention may operate in either the so-called transparent or non-transparent mode, as set out above, depending on particular circumstances. When the reported signal-to-interference-plus-noise ratio (SINR) of the desired UE 10 is moderate or relatively good or above a defined threshold, the DL TRP 200 can let the desired UE 10 work in transparent mode. However, when the reported SINR of the desired UE 10 falls below the defined threshold, the DL TRP 200 configures the desired UE 10 to work in non-transparent mode, i.e. it then operates to estimate the complex channel coefficient or the covariance matrix of the interfering channel and decodes user data with interference rejection receivers.

Embodiments of the present invention offer distinct advantages over prior art techniques used in dynamic TDD systems. In particular, embodiments of the invention provide an efficient method for the desired UE to measure interference channel when DL/UL mismatch occurs in NR dynamic TDD.

Embodiments can be either transparent or non-transparent to the desired UE, which can minimize the complexity of the UE, in particular in terms of its operating code. The particular mode chosen can be made dependent on a threshold and is under the control of the network via instructions from a TRP as set out previously. The particular threshold may be fixed or may change dynamically to reflect present network conditions.

Advantageously, cross-link interference between UEs (UE-UE CLI) can be at least reduced or, at best, suppressed using embodiments of this invention.

Embodiments of the invention are able to make use of known hardware resources in both UE and TRP systems. Operational code can be adapted as set out previously to ensure that UE and TRP resources are operable according to an embodiment of the invention.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of operating a telecommunication system using dynamic Time Division Duplex (TDD), the method comprising:
  transmitting, from a first Transmission Point (TRP) to a second TRP, information on a configuration of an uplink reference signal transmitted by a first User Equipment (UE);
  assigning, by the second TRP, downlink channel state information reference signal (CSI-RS) resources for a second UE to measure channel information of the first UE based on the information; and
  measuring, by the second UE, the channel information of the first UE at the downlink CSI-RS resources.

2. The method of claim 1, further comprising transmitting, from the second TRP to the second UE, a signal including information on a configuration of the first UE.

3. The method of claim 2, wherein the configuration of the uplink reference signal is an Uplink (UL) demodulation reference signal (DMRS) configuration.

4. The method of claim 3,
wherein the information is transmitted from the first TRP to the second TRP via a backhaul connection.

5. The method of claim 2, wherein the transmitting to the second UE of a signal comprising information concerning a configuration of the first UE is performed based on a reported signal-to-interference-plus-noise ratio (SINR) of the second UE being below a defined threshold.

6. The method of claim 1, further comprising receiving, by the second UE, a signal transmitted from the second TRP, using an interference rejection receiver.

7. The method of claim 6, wherein the interference rejection receiver comprises one of a Minimum Mean Squared Error Interference Rejection Combining (MMSE-IRC) receiver or a Minimum Mean Squared Error Maximum Ratio Combining (MMSE-MRC) receiver.

8. A telecommunication system comprising:
a first Transmission Point (TRP) and a second TRP;
a first User Equipment (UE) and a second UE;
the first TRP is configured to transmit information on a configuration of an uplink reference signal transmitted by the first UE to the second TRP,
the second TRP is configured to assign downlink channel state information reference signal (CSI-RS) resources for the second UE to measure channel information of the first UE based on the information, and
the second UE is configured to measure the channel information of the first UE at the downlink CSI-RS resources.

\* \* \* \* \*